US012735557B2

(12) United States Patent
Kashiwagi et al.

(10) Patent No.: US 12,735,557 B2
(45) Date of Patent: Sep. 15, 2026

(54) CELLULOSE PARTICLES

(71) Applicant: FUJIFILM Business Innovation Corp., Tokyo (JP)

(72) Inventors: Satomi Kashiwagi, Kanagawa (JP); Hirokazu Hamano, Kanagawa (JP); Tetsuya Taguchi, Kanagawa (JP); Kenji Yao, Kanagawa (JP); Yuko Iwadate, Kanagawa (JP); Hideaki Yoshikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 346 days.

(21) Appl. No.: 18/461,482

(22) Filed: Sep. 5, 2023

(65) Prior Publication Data

US 2024/0327618 A1 Oct. 3, 2024

(30) Foreign Application Priority Data

Mar. 29, 2023 (JP) ................................ 2023-054186

(51) Int. Cl.
*C08L 1/02* (2006.01)
*C08J 3/02* (2006.01)
*C08J 3/12* (2006.01)

(52) U.S. Cl.
CPC ................ *C08L 1/02* (2013.01); *C08J 3/128* (2013.01); *C08J 2301/12* (2013.01); *C08J 2379/02* (2013.01)

(58) Field of Classification Search
CPC ..... C08L 1/02; C08J 2301/12; C08J 2301/02; A61K 8/731
See application file for complete search history.

(56) References Cited

U.S. PATENT DOCUMENTS

| | | | | |
|---|---|---|---|---|
| 5,024,831 | A | 6/1991 | Kurisaki et al. | |
| 9,132,195 | B2 | 9/2015 | Honda et al. | |
| 2011/0062630 | A1* | 3/2011 | Honda | A61P 29/00 34/372 |
| 2021/0032372 | A1 | 2/2021 | Iwasa et al. | |
| 2021/0032415 | A1 | 2/2021 | Yoshimura et al. | |
| 2021/0403660 | A1 | 12/2021 | Oki et al. | |
| 2022/0306842 | A1 | 9/2022 | Oki et al. | |
| 2023/0303782 | A1* | 9/2023 | Abe | A61K 8/044 |

FOREIGN PATENT DOCUMENTS

| | | | | |
|---|---|---|---|---|
| CN | 114555678 | | 5/2022 | |
| EP | 4223273 | | 8/2023 | |
| EP | 4410873 | | 8/2024 | |
| EP | 4438668 | | 10/2024 | |
| JP | H01313413 | | 12/1989 | |
| JP | H09132514 | A * | 5/1997 | |
| JP | 5439366 | | 3/2014 | |
| JP | 2014240479 | | 12/2014 | |
| JP | 2019206662 | | 12/2019 | |
| WO | WO-2012162839 | A1 * | 12/2012 | A01K 1/0155 |
| WO | 2022050004 | | 3/2022 | |

OTHER PUBLICATIONS

Machine translation JPH09132514A (Year: 2025).*
Machine translation WO 2012162839 (Year: 2025).*
"Search Report of Europe Counterpart Application", issued on Feb. 19, 2024, p. 1-p. 10.
"Office Action of Europe Counterpart Application", issued on Mar. 21, 2025, p. 1-p. 9.
"Office Action of Europe Counterpart Application", issued on Sep. 12, 2025, p. 1-p. 6.

* cited by examiner

*Primary Examiner* — Alexandre F Ferre
(74) *Attorney, Agent, or Firm* — JCIPRNET

(57) ABSTRACT

Cellulose particles contain cellulose as a main component. The cellulose particles have a kinetic friction coefficient of 0.42 or less, a bulk density of 0.40 g/cm$^3$ or less, and a solidity of 50% or more.

11 Claims, No Drawings

CELLULOSE PARTICLES

CROSS-REFERENCE TO RELATED APPLICATIONS

This application is based on and claims priority under 35 USC 119 from Japanese Patent Application No. 2023-054186 filed Mar. 29, 2023.

BACKGROUND

(i) Technical Field

The present disclosure relates to cellulose particles.

(ii) Related Art

Japanese Unexamined Patent Application Publication No. 1-313413 proposes "a powdery cosmetic containing a spherical cellulose powder coated, impregnated, or chemically linked with one or two or more selected from moisture-retentive polymeric materials."

Japanese Unexamined Patent Application Publication No. 2019-206662 proposes "cellulose particles having an average particle diameter D50 of from 1 μm to 50 μm inclusive, a bulk density of 0.30 g/mL or less, a specific volume of 3.0 mL/g or more, and a linseed oil absorption amount of 100 mL/100 g or more."

Japanese Patent No. 5439366 proposes "a cellulose powder containing cellulose type I crystals and having an average particle diameter of less than 30 μm, a bulk density of 0.1 to 0.45 g/cm$^3$, a tapping density of 0.1 to 0.5 g/cm$^3$, a repose angle of 35 to 50°, a specific surface area of 0.1 or more and less than 20 m$^2$/g, and an internal frictional angle of 35 to 42°."

SUMMARY

Aspects of non-limiting embodiments of the present disclosure relate to solid (dense) cellulose particles containing cellulose as a main component. The cellulose particles have better sustained component release performance, spreadability, and loosening ability than cellulose particles having a kinetic friction coefficient of more than 0.42, a bulk density of more than 0.40 g/cm$^3$, or a solidity of less than 50%.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there are provided cellulose particles containing cellulose as a main component, wherein the cellulose particles have a kinetic friction coefficient of 0.42 or less, a bulk density of 0.40 g/cm$^3$ or less, and a solidity of 50% or more.

DETAILED DESCRIPTION

An exemplary embodiment of the present disclosure will be described below. The following description and Examples are illustrative of the exemplary embodiment and are not intended to limit the scope of the present disclosure.

In a set of numerical ranges expressed in a stepwise manner in the present disclosure, the upper or lower limit in one numerical range may be replaced with the upper or lower limit in another numerical range in the set of numerical ranges expressed in a stepwise manner. Moreover, in a numerical range described in the present disclosure, the upper or lower limit in the numerical range may be replaced with a value indicated in an Example.

Any component may contain a plurality of materials corresponding to the component.

When reference is made to the amount of a component in a composition, if the composition contains a plurality of materials corresponding to the component, the amount means the total amount of the plurality of materials in the composition, unless otherwise specified.

<Cellulose Particles>

Cellulose particles according to the present exemplary embodiment contain cellulose as a main component and have a kinetic friction coefficient of 0.42 or less, a bulk density of 0.40 g/cm$^3$ or less, and a solidity of 50% or more.

The cellulose particles according to the present exemplary embodiment that have the structure described above have good sustained component release performance, spreadability, and loosening ability. The reason for this may be as follows.

The cellulose particles are highly biodegradable and robust and are therefore expected to be used as a substitute for resin particles in various fields including cosmetic applications. Moreover, as the functionality of products in these applications increases, there is a need for the cellulose particles to have various functions.

The functions of the cellulose particles include spreadability and loosening ability. When the cellulose particles have high spreadability and loosening ability and are applied to cosmetics, the cosmetics themselves spread well, and a smooth skin feel and a soft and light skin feel are obtained.

Known examples of the cellulose particles that provide a good skin feel include porous spherical cellulose particles (for example, Japanese Unexamined Patent Application Publication No. 1-313413). These porous cellulose particles have a high ability to adsorb components (such as sebum, sweat, and active ingredients of the cosmetics). However, since the components are incorporated into the particles, the sustained component release performance is low. Similarly, cellulose particles having a large number of voids have low sustained component release performance. When the sustained component release performance is low, the moist feel when the cellulose particles are used in cosmetic applications deteriorates.

However, the cellulose particles according to the present exemplary embodiment are solid (dense) particles with a solidity of 50% or more and have a kinetic friction coefficient of 0.42 or less and a bulk density of 0.40 g/cm$^3$ or less. The cellulose particles having the above properties have a solid structure, and components are unlikely to be incorporated into these particles. Moreover, since the bulk density is low, the degree of irregularity of an irregular structure on the surface of the particles is large. Therefore, the components are easily accumulated in concave portions, and the sustained release performance is high.

When the particle surface has the irregular structure, the area of contact between the particles is small, and the loosening ability is also good. Since the kinetic friction coefficient is low, the spreadability is also good.

This may be the reason that the cellulose particles according to the present exemplary embodiment having the structure described above have good sustained component release performance, spreadability, and loosening ability.

(Kinetic Friction Coefficient)

The kinetic friction coefficient of the cellulose particles according to the present exemplary embodiment is 0.42 or less.

If the kinetic friction coefficient of the cellulose particles is high, the spreadability deteriorates. Therefore, the kinetic friction coefficient of the cellulose particles is set within the above range.

The kinetic friction coefficient of the cellulose particles according to the present exemplary embodiment is preferably 0.39 or less and more preferably 0.34 or less. However, if the kinetic friction coefficient is excessively small, the adhesion of the cellulose particles to the skin tends to decrease, and therefore the kinetic friction coefficient may be, for example, 0.20 or more.

The kinetic friction coefficient of the cellulose particles is measured as follows.

Cellulose particles used for the measurement are applied to a skin (BIO SKIN manufactured by Beaulax Co., Ltd.) at 0.5 mg/cm$^2$ to thereby obtain a measurement sample. A friction tester (HEIDON) is used to measure the kinetic friction coefficient of the particle-coated surface of the measurement sample.

The contactor used is a pseudo-fingertip sensor (10 mm square piano wire sensor manufactured by KATO TECH CO., LTD.). The measurement conditions are a load of 25 g, a speed of 1 mm/sec, and a test distance of 20 mm.

(Bulk Density)

The bulk density of the cellulose particles according to the present exemplary embodiment is 0.40 g/cm$^3$ or less.

If the bulk density of the cellulose particles is high, the degree of irregularity of the irregular structure on the particle surface is small, and the surface is smooth. In this case, the loosening ability is low. Therefore, the bulk density of the cellulose particles is set within the above range.

The bulk density of the cellulose particles according to the present exemplary embodiment may be 0.36 g/cm$^3$ or less. However, if the bulk density is excessively low, the handleability of the cellulose particles tends to deteriorate. Therefore, the bulk density may be 0.1 g/cm$^3$ or more.

The bulk density of the cellulose particles is measured as follows.

Cellulose particles used for the measurement are placed in a measuring cup included with a bulk density measurement apparatus (JIS-K-5101 for pigments) using a dispersing sieve included with the measurement apparatus.

The cellulose particles are levelled off at the upper end of the measuring cup, and the weight of the particles filled into the cup is computed from the change in the weight of the measuring cup before and after the cup is filled with the particles. The weight is divided by the volume of the measuring cup (30 cm$^3$) to compute the bulk density.

(Surface Smoothness)

The surface smoothness of the cellulose particles according to the present exemplary embodiment is preferably 80% or less and more preferably 70% or less.

When the surface smoothness of the cellulose particles is small, the degree of irregularities of the irregular structure on the particle surface is large, and the bulk density decreases. In this case, the loosening ability is improved.

However, if the surface smoothness is excessively small, the flowability of the powder tends to deteriorate. Therefore, the surface smoothness of the cellulose particles is, for example, 10% or more.

The surface smoothness of the cellulose particles is measured as follows.

An SEM image (magnification: 5000×) of the cellulose particles that is taken under a scanning electron microscope (SEM) is observed, and the smoothness M of each cellulose particle is computed using a formula below. The arithmetic mean of the smoothness values M of ten randomly selected cellulose particles is used as the surface smoothness. The closer the smoothness M is to 1, the smoother the surface of the cellulose particles.

$$M = (1 - (S3)/(S2)) \times 100$$

In the above formula, S2 is the area of a cellulose particle in the image (the projection area of the cellulose particle), and S3 is defined as follows. A circle having the same projection area as S2 is superimposed on the cellulose particle in the image. Then S3 is the sum of "the area of regions that are outside the outline of the circle having the same projection area as S2 and are inside the outline of the cellulose particle in the image" and "the area of regions that are inside the outline of the circle having the same projection area as S2 and are outside the outline of the cellulose particle in the image."

The method for superimposing the circle having the same projection area as S2 onto the cellulose particle in the image is as follows.

The circle having the same projection area as S2 is superimposed onto the cellulose particle in the image such that the area of the overlapping region of the two images (the area of a region that is inside the outline of the circle having the same projection area as S2 and is inside the outline of the cellulose particle in the image) is maximized.

(Solidity)

The solidity of the cellulose particles according to the present exemplary embodiment is 50% or more and is preferably 80% or more, more preferably 90% or more, and still more preferably 95% or more. The solidity of the cellulose particles is ideally 100%.

When the solidity of the cellulose particles is high, components are less likely to be incorporated into the particles, and therefore the sustained component release performance increases.

The solidity of the cellulose particles is measured as follows.

The cellulose particles are embedded in an epoxy resin and cut using, for example, a diamond knife to produce a specimen having an observation surface on which cross sections of the cellulose particles appear.

An SEM image of the cross section of a cellulose particle taken using a scanning electron microscope (SEM) is subjected to image analysis to compute the ratio of the area of the portion filled with the resin (i.e., cellulose) to the total area of the cross section of the cellulose particle.

Then the ratio of the area of the portion filled with the resin (i.e., cellulose) is measured in cross sections of ten or more randomly selected cellulose particles, and the average of the ratios is used as the solidity (area %).

(Volume Average Particle Diameter)

The volume average particle diameter of the cellulose particles according to the present exemplary embodiment is preferably from 1 μm to 20 μm inclusive, more preferably from 2 μm to 15 μm inclusive, and still more preferably from 5 μm to 10 μm inclusive.

When the volume average particle diameter of the cellulose particles is 1 μm or more, the cellulose particles are unlikely to aggregate, and the kinetic friction coefficient decreases, so that the spreadability is easily improved. When the volume average particle diameter of the cellulose particles is 20 μm or less, the surface area and the bulk density decrease, and the loosening ability is easily improved.

The volume average particle diameter of the cellulose particles is measured as follows.

An LS particle diameter distribution measurement apparatus "Beckman Coulter LS13 320 (manufactured by Beckman Coulter)" is used to measure the diameters of particles, and a cumulative particle diameter distribution is drawn from the small diameter side. A particle diameter at a cumulative frequency of 50% is determined as the volume average particle diameter.

(Cellulose)

The cellulose particles according to the present exemplary embodiment contain cellulose as a main component.

The phrase "contain cellulose as a main component" means that the content of cellulose with respect to the mass of the cellulose particles is 90% by mass or more.

When the cellulose particles each include a coating layer and an intermediate layer described later, the phrase "contain cellulose as a main component" means that the content of cellulose with respect to the mass of base particles is 90% by mass or more.

The number average molecular weight of the cellulose is preferably 37000 or more and more preferably 45000 or more.

No particular limitation is imposed on the upper limit of the number average molecular weight of the cellulose, and the upper limit may be 100000 or less.

When the number average molecular weight of the cellulose is 37000 or more, the cellulose particles obtained can more easily have good sustained component release performance, spreadability, and loosening ability. Moreover, the biodegradability of the cellulose particles is improved. The reason for this may be as follows.

When the number average molecular weight of the cellulose is 37000 or more, the number of terminal hydroxy groups per unit volume of the particles decreases, and the number of intramolecular and extramolecular hydrogen bonds decreases. In this case, the cellulose particles are unlikely to aggregate. Therefore, the sustained component release performance, the spreadability, and the loosening ability are improved.

Since the aggregation of the cellulose particles is suppressed, the specific surface area increases, and the biodegradability is also improved.

The number average molecular weight of the cellulose is measured by gel permeation chromatography (differential refractometer: Optilab T-rEX manufactured by Wyatt Technology, multi angle light scattering detector: DAWN HELEOS II manufactured by Wyatt Technology, columns: one TSKgel α-M and one TSKgel α-3000 manufactured by TOSOH Corporation) using dimethylacetamide (with 0.1M lithium chloride added thereto) as a solvent.

(Additional Components)

The cellulose particles according to the present exemplary embodiment may contain additional components. However, when the cellulose particles include a coating layer described later, the additional components are contained in base particles coated with the coating layer.

Examples of the additional components include a plasticizer, a flame retardant, a compatibilizer, a release agent, a light-resisting agent, a weather-resisting agent, a coloring agent, a pigment, a modifier, a dripping inhibitor, an antistatic agent, an anti-hydrolysis agent, a filler, reinforcing agents (such as glass fibers, carbon fibers, talc, clay, mica, glass flakes, milled glass, glass beads, crystalline silica, alumina, silicon nitride, aluminum nitride, and boron nitride), acid acceptors for preventing release of acetic acid (oxides such as magnesium oxide and aluminum oxide; metal hydroxides such as magnesium hydroxide, calcium hydroxide, aluminum hydroxide, and hydrotalcite; calcium carbonate; and talc), and reactive trapping agents (such as epoxy compounds, acid anhydride compounds, and carbodiimides).

The content of each additional component with respect to the total mass of the cellulose particles (or the base particles) may be from 0% by mass to 5% by mass inclusive. The term "0% by mass" means that the corresponding additional component is not contained.

(Cellulose Particles Including Coating Layer)

The cellulose particles according to the present exemplary embodiment may be cellulose particles each including a base particle containing cellulose as a main component (hereinafter may be referred to as a cellulose base particle) and a coating layer that covers the base particle (hereinafter may be referred to as "cellulose particles including the coating layer."

The cellulose particles according to the present exemplary embodiment have the coating layer formed thereon. This allows their surface properties to be easily controlled, and the kinetic friction coefficient, bulk density, surface smoothness, etc. of the cellulose particles can be easily controlled within the above-described ranges. Therefore, the sustained component release performance, the spreadability, and the loosening ability can be more easily improved.

—Base Particles—

The base particles contain cellulose as a main component.

The cellulose contained in the base particles is the same as the cellulose described above, and its preferred ranges are the same as those for the cellulose described above.

—Coating Layer—

The coating layer may contain at least one coating material selected from the group consisting of a fatty acid, a fatty acid metal salt, and an amino acid compound. Other examples of the coating material include lipid compounds, silicone compounds, fluorine compounds, and ceramide compounds.

—Fatty Acid

The fatty acid is a linear or branched saturated or unsaturated fatty acid. The fatty acid may be a mixture of a saturated fatty acid and an unsaturated fatty acid.

The fatty acid may be a fatty acid having 16 to 22 carbon atoms (preferably 18 to 20 carbon atoms). Specific examples of the linear fatty acid having 16 to 22 carbon atoms include behenic acid, arachidic acid, and palmitic acid.

—Fatty Acid Metal Salt

The fatty acid metal salt is a linear or branched saturated or unsaturated fatty acid metal salt. The fatty acid metal salt may be a mixture of a saturated fatty acid metal salt and an unsaturated fatty acid metal salt.

The fatty acid metal salt may be a metal salt of a fatty acid having 16 to 22 carbon atoms (preferably 18 to 20 carbon atoms). Examples of the metal salt of a fatty acid having 16 to 22 carbon atoms include metal salts of stearic acid, metal salts of behenic acid, and metal salts of palmitic acid.

Examples of the metal in the fatty acid metal salt include divalent metals.

Specific examples of the metal in the linear fatty acid metal salt include magnesium, calcium, aluminum, barium, and zinc.

—Amino Acid Compound

The amino acid compound is an amino acid or an amino acid derivative.

Examples of the amino acid compound include lauryl leucine, lauryl arginine, and myristyl leucine.

The coating material included in the coating layer is not limited to those exemplified above, and other examples of the coating material include lipid compounds (such as phosphate lipids), silicone compounds (such as dimethylsiloxane), fluorinated compounds (such as perfluoropolyether), and ceramide compounds (such as hydroxypropyl bispalmitamide MEA).

From the viewpoint of improving the sustained component release performance, the spreadability, and the loosening ability, the coating mass of the coating layer with respect to the base particle is preferably from 0.1% by mass to 30% by mass inclusive, more preferably from 0.5% by mass to 20% by mass inclusive, and still more preferably from 1% by mass to 15% by mass inclusive.

The content of the coating material with respect to the total mass of the coating layer is preferably from 90% by mass to 100% by mass inclusive and more preferably from 95% by mass to 100% by mass inclusive.

—Intermediate Layer—

In the cellulose particles having the coating layer, an intermediate layer may be provided between the base particle and the coating layer. The intermediate layer may contain at least one intermediate material selected from the group consisting of polyamine compounds, polyquaterniums, polysaccharide compounds, and polyacrylic acids.

In the cellulose particles according to the present exemplary embodiment, when the intermediate layer is disposed between the base particle and the coating layer, delamination of the coating layer is prevented, and the sustained component release performance, the spreadability, and the loosening ability are easily maintained. In particular, with the intermediate material, the adhesion between the cellulose base particle and the coating layer containing the coating material increases, and the sustained component release performance, the spreadability, and the loosening ability are easily maintained.

The polyamine compound is a generic term of aliphatic hydrocarbons having two or more primary amino groups.

Example of the polyamine compound include polyalkylenimine, polyallylamine, polyvinylamine, and polylysine.

From the viewpoint of improving biodegradability, the polyalkylenimine is preferably a polyalkylenimine including a structural unit having an alkylene group having 1 to 6 carbon atoms (preferably 1 to 4 carbon atoms and more preferably 1 to 2 carbon atoms) and more preferably polyethyleneimine.

Examples of the polyallylamine include homopolymers and copolymers of allylamine, allylamine amidosulfate, diallylamine, and dimethylallylamine.

The polyvinylamine is, for example, a product produced by hydrolysis of poly(N-vinylformamide) with an alkali, and specific examples include "PVAM-0595B" manufactured by Mitsubishi Chemical Corporation.

The polylysine may be a material extracted from a natural product, a material produced using a transformed microorganism, or a chemically synthesized material.

Examples of the polyquaternium include polyquaternium-6, polyquaternium-7, polyquaternium-10, polyquaternium-11, polyquaternium-51, polyquaternium-61, and polyquaternium-64.

The content of the polyquaternium with respect to the total mass of the cellulose particles may be from 0.2% by mass to 2% by mass inclusive.

From the viewpoint of improving the sustained component release performance, the spreadability, and the loosening ability, the coating mass of the intermediate layer with respect to the base particle is preferably from 0.1% by mass to 10% by mass inclusive and more preferably from 0.25% by mass to 3% by mass inclusive.

The content of the intermediate material with respect to the total mass of the intermediate layer is preferably from 90% by mass to 100% by mass inclusive and more preferably from 95% by mass to 100% by mass inclusive.

—External Additive—

Inorganic particles may be externally added to the cellulose particles according to the present exemplary embodiment. When the inorganic particles are externally added, secondary aggregation of the particles is prevented, and therefore the particles can easily exert their intrinsic properties. Therefore, the sustained component release performance, the spreadability, and the loosening ability can be easily improved. Moreover, a reduction in biodegradability may be prevented.

The external additive may be at least one selected from the group consisting of silicon-containing compound particles and metal oxide particles.

The silicon-containing compound particles are particles containing silicon.

The silicon-containing compound particles may be particles containing only silicon or may be particles containing silicon and other elements.

The silicon-containing compound particles may be silica particles. The silica particles may be particles containing silica, i.e., $SiO_2$, as a main component and may be crystalline or amorphous. The silica particles may be particles produced using a silicon compound such as water glass or alkoxysilane as a raw material or may be particles obtained by pulverizing quartz.

An oxide of a metal other than silicon can be used as the metal oxide.

Examples of the metal oxide include zinc oxide, magnesium oxide, iron oxide, and aluminum oxide.

From the viewpoint of a feel (specifically, a texture), the volume average particle diameter of the external additive is preferably from 1 nm to 100 nm inclusive and more preferably from 5 nm to 30 nm inclusive.

The volume average particle diameter of the external additive is measured using the same method as the method for measuring the volume average particle diameter of cellulose.

The amount of the external additive added externally may be from 0.1% by mass to 2% by mass inclusive with respect to the total mass of the cellulose particles (the cellulose particles with no external additive externally added thereto).

<Method for Producing Cellulose Particles>

A method for producing the cellulose particles according to the present exemplary embodiment is, for example, as follows.

—Process of Producing Cellulose Particles (Base Particles)—

(1) First, cellulose acylate is dissolved in a solvent mixture of a water-soluble organic solvent A and a water-soluble organic solvent B to prepare a cellulose acylate solution A.

(2) Next, the cellulose acylate solution A is added to a calcium carbonate dispersion obtained by dispersing calcium carbonate in water, and the mixture is stirred to prepare a cellulose acylate solution B.

(3) Next, the cellulose acylate solution B is added to a solution mixture of carboxymethyl cellulose, a water-soluble organic solvent B, and water, and the mixture is stirred at high speed to prepare a cellulose acylate solution C.

(4) Next, sodium hydroxide is added to the cellulose acylate solution C, and then the resulting cellulose acylate solution C is heated to remove the water-soluble organic solvents A and B. Then hydrochloric acid is added to form cellulose acylate particles. Then the cellulose acylate particles are separated by filtration. The separated cellulose acylate particles are dispersed in water to prepare a cellulose acylate particle dispersion.

(5) Next, sodium hydroxide is added to the cellulose acylate particle dispersion. The resulting cellulose acylate particle dispersion is heated in a weak alkaline environment and stirred to saponify the cellulose acylate particles, and a cellulose particle suspension is thereby prepared.

(6) Next, hydrochloric acid is added to the cellulose particle suspension to adjust the pH of the suspension to near neutral (e.g., in the range of from 6.5 to 7 inclusive). Then the cellulose particles are repeatedly separated by filtration and washed with pure water. When the conductivity of the filtrate becomes 10 μs/cm or less, the cellulose particles separated by filtration are dried.

In the above-described production process, by adjusting the mass ratio of the water-soluble organic solvent A to the water-soluble organic solvent B in the solvent mixture capable of dissolving the cellulose acylate, the kinetic friction coefficient, bulk density, surface smoothness, solidity, etc. of the cellulose particles can be controlled.

The solidity can also be controlled by adding heptanol to the cellulose acylate solution A.

By adjusting the amount of carboxymethyl cellulose, the volume average particle diameter of the cellulose particles can be controlled.

By controlling these properties, the cellulose particles according to the present exemplary embodiment are obtained.

The cellulose acylate is a cellulose derivative obtained by replacing at least one hydroxy group in cellulose with an aliphatic acyl group (acylating the cellulose). Specifically, the cellulose acylate is a cellulose derivative in which at least one hydroxy group in the cellulose is replaced with —CO—$R^{AC}$ ($R^{AC}$ represents an aliphatic hydrocarbon group).

The water-soluble organic solvent A is a solvent that allows 0.1% by mass to 10% by mass of water to dissolve therein at 25° C., and example thereof include ethyl acetate and butyl acetate.

The water-soluble organic solvent B is a solvent that allows 0.1% by mass to 10% by mass of water to dissolve therein at 25° C., and examples thereof include methyl ethyl ketone and acetone.

—Process of Forming Intermediate Layer and Coating Layer—

When the cellulose particles produced include the coating layer, the process of forming the coating layer (a coating layer forming process) may be performed after the cellulose particle (base particle) production process.

When the coating layer forming process is performed, the particles obtained through the cellulose particle (base particle) production process are used as base particles, and the coating layer is formed thereon.

First, a water dispersion containing the base particles dispersed therein is prepared. The base particles may be washed with an acid before the preparation of the water dispersion.

Next, the water dispersion containing the base particles dispersed therein is mixed with an aqueous solution containing a compound forming the intermediate layer. In this manner, for example, hydroxy groups of the resin contained in the base particles react with amine sites, carboxyl groups, amino groups, etc. of the compound forming the intermediate layer, or the hydroxy groups form hydrogen bonds, and the intermediate layer is thereby formed. The water dispersion in which the base particles having the intermediate layer formed thereon are dispersed is mixed with an emulsion containing a compound forming the coating layer. The coating layer is thereby formed.

When the intermediate layer is not formed, a water dispersion in which the base particles obtained through the cellulose particles (base particle) production process are dispersed is mixed with an emulsion containing the compound forming the coating layer to form the coating layer.

Then the cellulose particles having the coating layer are separated from the solution mixture. To separate the cellulose particles having the coating layer, the solution mixture is subjected to, for example, filtration. The separated cellulose particles having the coating layer may be washed with water. In this manner, an unreacted surface treating polymer can be removed. Then the cellulose particles having the coating layer are dried, and the cellulose particles according to the present exemplary embodiment are thereby obtained.

—External Addition Process—

An external additive may be added to the obtained cellulose particles.

The external addition process may be, for example, treatment in which the external additive is added to the cellulose particles using a mixing mill, a V blender, a Henschel mixer, a Loedige mixer, etc.

<Applications>

Examples of the application of the cellulose particles according to the present exemplary embodiment include granular materials such as cosmetics, rolling materials, abrasives, scrubbing agents, display spacers, materials for bead molding, light diffusing particles, resin strengthening agents, refractive index control agents, biodegradation accelerators, fertilizers, water-absorbent particles, toner particles, and anti-blocking particles.

The application of the cellulose particles according to the present exemplary embodiment may be cosmetics.

In particular, the application of the cellulose particles according to the present exemplary embodiment may be an additive for cosmetics.

The cellulose particles according to the present exemplary embodiment are applicable to, for example, additives for cosmetics such as base makeup cosmetics (such as makeup bases, concealers, foundations, and face powders), makeup cosmetics (such as lipsticks, glosses, lip liners, cheek cosmetics, eye shadows, eyeliners, mascaras, eyebrow cosmetics, nail polishes, and nail care cosmetics), and skin care cosmetics (such as facial cleansers, cleansing creams, lotions, emulsions, liquid foundations, face packs, face masks, and eye and mouth care cosmetics).

In particular, the cellulose particles according to the present exemplary embodiment may be used as cosmetic additives for makeup cosmetics because the cosmetic additives for makeup cosmetics are required to have flexibility and biodegradability.

EXAMPLES

Examples will next be described. However, the present disclosure is not limited to these Examples. In the following description, "parts" and "%" are based on mass, unless otherwise specified.

<Preparation of Materials>

The following materials are prepared.

(Cellulose Acylate)

CA-1: Diacetyl cellulose, "L50" manufactured by Daicel Corporation, number average molecular weight: 58000

(Coating Material)

ST-1: Calcium stearate (fatty acid metal salt), "Calcium stearate vegetable" NOF CORPORATION ST-2: Behenic acid (fatty acid), "NAA-222S" NOF CORPORATION (Intermediate Material)

AA-1: Polyethyleneimine (polyamine compound), "PEI-1500" NIPPON SHOKUBAI Co., Ltd.

Examples 1 to 9 and Comparative Example 1

—Formation of Base Particles—

130 Parts of cellulose acylate of the type shown in Table 1 is dissolved in a solvent mixture of ethyl acetate and methyl ethyl ketone (MEK) mixed in amounts shown in Table 1 or a single solvent of ethyl acetate in an amount shown in Table 1. Heptanol in an amount shown in Table 1 is optionally added to the above mixture, and the resulting mixture is stirred. The mixture is added to a dispersion prepared by dispersing 50 parts of calcium carbonate in 500 parts of pure water, and the resulting mixture is stirred for 3 hours. The mixture is added to a dispersion prepared by dispersing carboxymethyl cellulose in 600 parts of pure water, and the resulting mixture is stirred at 80° C. for 3 hours to remove ethyl acetate and methyl ethyl ketone. 10 Parts of dilute hydrochloric acid is added to the mixture to dissolve calcium carbonate. The residue is filtrated and re-dispersed in 900 parts of pure water to thereby obtain a base particle slurry.

—Saponification of Base Particles—

17.5 Parts of 20% NaOH is added to 500 parts of the base particle slurry (solid content: 10%), and the mixture is stirred in an environment of 30° C. for 6 hours. Hydrochloric acid is added to the saponified slurry to adjust the pH to 7. Then filtration and washing are repeated, and washing is performed until the conductivity of the filtrate becomes 10 μs/cm or less to thereby obtain cellulose particles. The obtained base particles are dried at 80° C. for 3 hours to remove the solvent. A base particle cake is thereby obtained.

—Surface Treatment—

The washed base particle cake is again brought into a slurry state using ion exchanged water, and the weight of the slurry is adjusted to 500 g. Then an intermediate material of the type shown in Table 1 in an amount giving a coating mass shown in Table 1 is added, and the mixture is stirred for 1 hour. Then a coating material of a type shown in Table 1 in an amount giving a coating mass shown in Tale 1 is added, and the mixture is stirred for 24 hours. An intermediate layer and a coating layer are thereby formed on the base particles.

Then the base particles having the intermediate layer and the coating layer formed thereon are repeatedly filtered and washed and then washed until the conductivity of the filtrate becomes 10 μs/cm or less. After the washing, the obtained cake is dried to thereby obtain cellulose acetate particles having the intermediate layer and the coating layer formed thereon.

The obtained particles are stirred using an FM mixer (FM40 manufactured by Nippon Coke & Engineering Co., Ltd.) at a rotation speed of 2000 min-1 for 3 hours while the temperature of the mixer is maintained at 25° C. to thereby smoothen the surface of the coating layer.

In some Examples, at least one of the formation of the intermediate layer, the formation of the coating layer, and the external addition of the external additive is not performed to produce cellulose particles, as indicated by "-" in Table 1.

Comparative Examples 2 to 4

The following commercial cellulose particles are used as cellulose particles in Comparative Examples 2 to 4.

Comparative Example 2: "CELLULOBEADS D5 treated with magnesium stearate" DAITO KASEI KOGYO CO., LTD.

Comparative Example 3: "CELLULOBEADS USF-X" DAITO KASEI KOGYO CO., LTD.

Comparative Example 4: "CELLUFLOW C25" JNC Corporation

<Evaluation of Physical Properties>

(Properties of Particles)

The following properties of the cellulose particles obtained in the Examples are measured using the methods described above.

Kinetic friction coefficient of cellulose particles

Bulk density of cellulose particles

Surface smoothness of cellulose particles

Solidity of cellulose particles

Volume average particle diameter of cellulose particles (denoted by "Particle diameter" in Table 1)

<Evaluation>

The sustained component release performance, spreadability, and loosening ability of the cellulose particles in the Examples are evaluated as follows.

—Sustained Component Release Performance (Moist Feel)—

75 Parts of talc, 10 parts of mica, 10 parts of cellulose particles, 3 parts of titanium dioxide, and 2 parts of sodium hyaluronate are mixed to prepare a face powder. Ten female testers are selected, and 0.3 g of the face powder sample is applied to the back of their hand. After a lapse of 30 minutes, the testers are asked to rate the moist feel. Specifically, 10 is the best, and 0 is the worst. The arithmetic average of the rating scores by the ten testers is determined for evaluation.

—Spreadability—

Ten female testers are selected, and 0.3 g of a cellulose particle sample is placed on the back of their hand and spread over the skin. The testers are asked to rate the spreadability. Specifically, 10 is the best, and 0 is the worst. The arithmetic average of the rating scores by the ten testers is determined for evaluation.

—Loosening Ability—

Ten female testers are selected, and 0.3 g of a cellulose particle sample is applied to the back of their hand and spread over the skin. The testers are asked to rate the ease of loosening the powder. Specifically, 10 is the best, and 0 is the worst. The arithmetic average of the rating scores by the ten testers is determined for evaluation.

TABLE 1

| | Cellulose particles (base particles) | | | | Surface treatment | | | | | |
|---|---|---|---|---|---|---|---|---|---|---|
| | | Solvent mixture for dissolving raw material cellulose acylate | | | Coating layer (coating material) | | Intermediate layer (intermediate material) | | Properties of particles | |
| | Raw material cellulose acylate | Amount A of ethyl acetate/ parts | Amount B of MEK/ parts | Amount C of heptanol/ parts | Type | % by weight (with respect to base particles) | Type | % by weight (with respect to base particles) | Surface smoothness % | Solidity % |
| Example 1 | CA-1 | 400 | 300 | 0 | ST-1 | 15 | AA-1 | 1 | 60 | 90 |
| Example 2 | CA-1 | 400 | 300 | 70 | ST-1 | 15 | — | — | 70 | 80 |
| Example 3 | CA-1 | 400 | 300 | 0 | ST-1 | 15 | — | — | 70 | 95 |
| Example 4 | CA-1 | 400 | 300 | 0 | ST-2 | 8 | AA-1 | 1 | 65 | 93 |
| Example 5 | CA-1 | 300 | 600 | 0 | — | — | — | — | 80 | 95 |
| Example 6 | CA-1 | 400 | 300 | 0 | ST-2 | 15 | — | — | 70 | 90 |
| Example 7 | CA-1 | 300 | 600 | 90 | — | — | — | — | 80 | 80 |
| Example 8 | CA-1 | 400 | 300 | 70 | ST-1 | 15 | — | | 70 | 80 |
| Example 9 | CA-1 | 400 | 300 | 140 | — | — | — | — | 80 | 50 |
| Comparative Example 1 | CA-1 | 870 | — | — | ST-2 | 0.05 | AA-1 | 0.2 | 70 | 90 |
| Comparative Example 2 | "CELLULOBEADS D5 treated with magnesium stearate" DAITO KASEI KOGYO CO., LTD. | | | | | | | | 90 | 95 |
| Comparative Example 3 | "CELLULOBEADS USF-X" DAITO KASEI KOGYO CO., LTD. | | | | | | | | 95 | 95 |
| Comparative Example | "CELLUFLOW C-25" JNC Corporation | | | | | | | | 98 | 40 |
| Comparative Example 5 | "CELLULOBEADS D-30" DAITO KASEI KOGYO CO., LTD. | | | | | | | | 98 | 95 |

| | Properties of particles | | | Evaluation | | |
|---|---|---|---|---|---|---|
| | Kinetic friction coefficient | Bulk density g/cm3 | Particle diameter μm | Sustained release performance (moist feel) | Spread-ability | Loosening ability |
| Example 1 | 0.32 | 0.18 | 6.0 | 8 | 8 | 9 |
| Example 2 | 0.30 | 0.36 | 6.2 | 7 | 9 | 8 |
| Example 3 | 0.29 | 0.29 | 6.0 | 9 | 9 | 8 |
| Example 4 | 0.42 | 0.33 | 6.0 | 8 | 6 | 8 |
| Example 5 | 0.41 | 0.40 | 7.5 | 9 | 6 | 6 |
| Example 6 | 0.39 | 0.38 | 6.7 | 8 | 8 | 7 |
| Example 7 | 0.4 | 0.37 | 7.5 | 7 | 7 | 7 |
| Example 8 | 0.32 | 0.36 | 6.3 | 7 | 8 | 8 |
| Example 9 | 0.34 | 0.40 | 15.2 | 6 | 8 | 6 |
| Comparative Example 1 | 0.48 | 0.28 | 6.6 | 8 | 3 | 8 |
| Comparative Example 2 | 0.34 | 0.42 | 11.6 | 9 | 9 | 4 |
| Comparative Example 3 | 0.44 | 0.43 | 6.6 | 9 | 1 | 4 |
| Comparative Example | 0.31 | 0.31 | 8.6 | 3 | 8 | 8 |
| Comparative Example 5 | 0.27 | 0.78 | 32.3 | 8 | 9 | 3 |

As can be seen from the above results, the cellulose particles in the Examples have better sustained component release performance, spreadability, and loosening ability than the cellulose particles in the Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

Appendix (((1)))

Cellulose particles containing cellulose as a main component, wherein the cellulose particles have a kinetic friction coefficient of 0.42 or less, a bulk density of 0.40 g/cm$^3$ or less, and a solidity of 50% or more.

(((2)))

The cellulose particles according to (((1))), wherein the kinetic friction coefficient is 0.39 or less.

(((3)))

The cellulose particles according to (((2))), wherein the bulk density is 0.36 g/cm$^3$ or less.

(((4)))

The cellulose particles according to any one of (((1))) to (((3))), wherein the cellulose particles have a surface smoothness of 80% or less.

(((5)))

The cellulose particles according to (((4))), wherein the surface smoothness is 70% or less.

(((6)))

The cellulose particles according to any one of (((1))) to (((5))), wherein the solidity is 80% or more.

(((7)))

The cellulose particles according to (((6))), wherein the solidity is 90% or more.

(((8)))

The cellulose particles according to any one of (((1))) to (((7))), wherein the cellulose particles have a surface smoothness of 80% or less, and wherein the solidity is 80% or more.

(((9)))

The cellulose particles according to (((8))), wherein the bulk density is 0.36 g/cm$^3$ or less, and wherein the surface smoothness is 70% or less.

(((10)))

The cellulose particles according to any one of (((1))) to (((9))), wherein the cellulose particles have a volume average particle diameter of from 1 μm to 20 μm inclusive.

(((11)))

The cellulose particles according to any one of (((1))) to (((10))), each including: a base particle containing the cellulose as a main component; and a coating layer that covers the base particle.

(((12)))

The cellulose particles according to (((11))), wherein the coating layer contains at least one coating material selected from the group consisting of a fatty acid, a fatty acid metal salt, and an amino acid compound.

What is claimed is:

1. Cellulose particles, each comprising:

a base particle containing cellulose as a main component, a coating layer that covers the base particle; and an intermediate layer between the base particle and the coating layer, wherein a coating mass of the coating layer with respect to the base particle is from 0.1% by mass to 30% by mass, a coating mass of the intermediate layer with respect to the base particle is from 0.1% by mass to 10% by mass, the cellulose particles have a kinetic friction coefficient of 0.42 or less, a bulk density of 0.40 g/cm$^3$ or less, a solidity of 50% or more, and a volume average particle diameter of from 1 μm to 20 μm inclusive.

2. The cellulose particles according to claim 1, wherein the kinetic friction coefficient is 0.39 or less.

3. The cellulose particles according to claim 2, wherein the bulk density is 0.36 g/cm$^3$ or less.

4. The cellulose particles according to claim 1, wherein the cellulose particles have a surface smoothness of 80% or less.

5. The cellulose particles according to claim 4, wherein the surface smoothness is 70% or less.

6. The cellulose particles according to claim 1, wherein the solidity is 80% or more.

7. The cellulose particles according to claim 6, wherein the solidity is 90% or more.

8. The cellulose particles according to claim 1, wherein the cellulose particles have a surface smoothness of 80% or less, and wherein the solidity is 80% or more.

9. The cellulose particles according to claim 8, wherein the bulk density is 0.36 g/cm$^3$ or less, and wherein the surface smoothness is 70% or less.

10. The cellulose particles according to claim 1, wherein the coating layer contains at least one coating material selected from the group consisting of a fatty acid, a fatty acid metal salt, and an amino acid compound.

11. Cellulose particles, each comprising:

a base particle containing cellulose as a main component, a coating layer that covers the base particle, wherein the coating layer contains at least one coating material selected from the group consisting of a fatty acid, a fatty acid metal salt, and an amino acid compound; and an intermediate layer between the base particle and the coating layer, wherein a coating mass of the coating layer with respect to the base particle is from 0.1% by mass to 30% by mass, a coating mass of the intermediate layer with respect to the base particle is from 0.1% by mass to 10% by mass, the cellulose particles have a kinetic friction coefficient of 0.42 or less, a bulk density of 0.40 g/cm$^3$ or less, and a solidity of 50% or more.

* * * * *